Patented Dec. 17, 1935

2,024,923

UNITED STATES PATENT OFFICE 2,024,923

PROCESS OF MAKING XANTHATES

Wilhelm Hirschkind, Berkeley, Calif., assignor to Great Western Electro-Chemical Company, San Francisco, Calif., a corporation of California No Drawing. Application April 7, 1932, Serial No. 603,890

10 Claims. (Cl. 260—99.11)

The present invention relates to a method for the manufacture of xanthates from any alcohol, whether primary, secondary or tertiary, and, in particular to alkali metal xanthates.

Alkali metal xanthates have heretofore been produced by first reacting caustic alkali with alcohols to form alcoholate and subsequently adding carbon bisulphide to form xanthates. The reaction has been carried on in one or two steps, in the presence of excess alcohol, water or any other diluting medium, and also in absence of any but the reacting constituents, care being taken that the large amount of heat given off by the xanthate reaction was removed by cooling in every instance. This because if the reaction temperature rises above 35° C. the formation of thiocarbonates and sulphides proceeds simultaneously with the xanthate formation, thus contaminating the product. For this reason all heretofore known methods specify cooling to the extent of keeping the temperature below approximately 35° C. Too low a temperature, on the other hand, while making a fairly satisfactory xanthate, reduces the rate of the reaction considerably, especially in the case of higher alcohol xanthates.

According to the present invention, xanthates can be produced at those high temperatures heretofore deemed impracticable because of the undesirable side reactions occurring. Thus, instead of having to cool to maintain the temperature of the reaction mass low, since the reaction is an exothermic one, the temperature can be allowed to rise and the reaction permitted to proceed rapidly to produce a xanthate not contaminated with side reaction products. The reaction conducted according to the present invention, therefore, proceeds rapidly to completion without the necessity of cooling the mass to secure a high grade final product.

It is my discovery that if the alcoholate which is reacted with the carbon bisulphide be free from water, the side reactions do not occur and the temperature need not be kept below 35° C. As an explanation for my discovery, I now believe, although I do not wish to be restricted to this, that the undesirable products such as sulphides and thiocarbonates result from side reactions due to the presence of water and that the absence of water prevents these side reactions from occurring because reacting constituents do not hydrolyze and because reactions between reacting constituents and water are eliminated.

The quantity of water present is preferably nil. However, some water can be present, the only effect of water being to lower the temperature at which the process can be conducted without the side reactions occurring to the detriment of the product.

The anhydrous alcoholate, or substantially anhydrous alcoholate, can be derived from any source or in any desired manner. Thus it can be formed by reacting anhydrous alcohol with metallic sodium or potassium or by reacting the hydroxide with the alcohol and removing the water formed by means of a drying salt as is disclosed in copending application Ser. No. 619,272. The anhydrous alcoholate can also be formed by distilling an azeotropic mixture as in the Kyrides U. S. Patent 1,712,830, or by the use of pressure as in the Halbig and Kaufler Patent 1,816,843. After the desired anhydrous alcoholate is formed, the carbon bisulphide is added to form the corresponding xanthate. With an anhydrous alcoholate the temperature can be high and I have formed xanthates successfully at 80° C. and above the boiling point of carbon bisulphide by placing a reflux condenser on the apparatus and returning the carbon bisulphide to the reaction.

To illustrate the invention in detail as successfully practised, the following specific examples are set forth of the manufacture of xanthates substantially free of any sulphides or thiocarbonates so that a desired xanthate is secured directly and without the necessity of drying and purifying the xanthate. In these, the reaction mass was not cooled and the temperature was permitted to rise far above 35° C. In one instance a temperature of 80° C. was noted.

Example No. 1

68 lbs. of anhydrous sodium ethylate prepared by known methods such as the action of metallic sodium and ethyl alcohol, or according to U. S. Patent 1,712,830, was treated in a reaction vessel, provided with a reflux condenser, gradually, but without cooling, with 77 lbs. of carbon bisulphide. On completion of the reaction, there were left 144 lbs. of sodium ethyl xanthate of a purity of over 98%.

Example No. 2

84 lbs. of anhydrous potassium ethylate prepared by known methods was treated in a similar manner with 77 lbs. of carbon bisulphide without cooling. The final mass consisted of 160 lbs. potassium ethyl xanthate of a purity of over 99%.

Example No. 3

112 lbs. of anhydrous potassium butylate prepared by known methods was reacted without cooling with 77 lbs. of carbon bisulphide. A quantity of 188 lbs. potassium butyl xanthate of a purity of 98% was obtained.

Example No. 4

100 lbs. sodium amylate (sodium amyl alcoholate) was reacted without cooling, with 77 lbs. of carbon bisulphide. The yield obtained was 175 lbs. of sodium amyl xanthate of a purity of 97%.

The term "substantially anhydrous" is used herein and in the claims as including conditions wherein water is present only in a relatively minute trace and in no event is this term to be construed as including any percentage of water of the order of 20%. The value of this invention is only secured when and if no water is present. Since it is difficult to manufacture or maintain anything 100% anhydrous, the term "substantially anhydrous" is used as applying only to conditions wherein water is not present in any amount sufficient to affect the purity of the product secured or the temperature of formation.

I claim:—

1. A xanthation process comprising bringing into contact in substantially molecular proportions carbon bisulphide and a substantially anhydrous alkali metal alcoholate of a primary aliphatic monohydric alcohol and in such quantities that the heat of reaction between the bisulphide and alcoholate raises the temperature of the reacting mass and the reaction proceeds, substantially without alteration of the temperature of the reacting mass by external conditions, to produce directly as a reaction product a stable, dry and pure alkali metal xanthate of a primary aliphatic monohydric alcohol free of water, mother liquor unreacted constituents and side reaction products.

2. A xanthation process comprising bringing into contact in substantially molecular proportions carbon bisulphide and a substantially anhydrous alkali metal alcoholate of a primary aliphatic monohydric alcohol in such quantities that the heat of reaction between the bisulphide and alcoholate raises the temperature of the reacting mass to about 80° C. to produce directly as a reaction product a stable, dry and pure alkali metal xanthate of a primary aliphatic monohydric alcohol free of water, mother liquor unreacted constituents and side reaction products.

3. Reacting a substantially anhydrous alkali metal ethylate with carbon bisulfide at about 80° C.

4. Reacting a substantially anhydrous alkali metal ethylate with carbon bisulfide and permitting the heat of reaction to raise the temperature of the reacting mass.

5. Reacting in substantially molecular proportions a substantially anhydrous alkali metal ethylate with carbon bisulfide at about 80° C.

6. Reacting in substantially molecular proportions a substantially anhydrous alkali metal ethylate with carbon bisulfide and permitting the heat of reaction to raise the temperature of the reacting mass.

7. A xanthation process comprising bringing into contact in substantially molecular proportions carbon bisulphide and a substantially anhydrous alkali metal butylate and in such quantities that the heat of reaction between said bisulphide and butylate raises the temperature of the reacting mass and the reaction proceeds, substantially without alteration of the temperature of the reacting mass by external conditions, to produce directly as a reaction product a stable, dry and pure alkali metal butyl xanthate free of water, mother liquor, unreacted constituents and side reaction products.

8. A xanthation process comprising bringing into contact in substantially molecular proportions carbon bisulphide and a substantially anhydrous alkali metal butylate and in such quantities that the heat of reaction between said bisulphide and butylate raises the temperature of the reacting mass to about 80° C. to produce directly as a reaction product a stable, dry and pure alkali metal butyl xanthate free of water, mother liquor, unreacted constituents and side reaction products.

9. A xanthation process comprising bringing into contact in substantially molecular proportions carbon bisulphide and a substantially anhydrous alkali metal amylate and in such quantities that the heat of reaction between said bisulphide and amylate raises the temperature of the reacting mass and the reaction proceeds, substantially without alternation of the temperature of the reacting mass by external conditions, to produce directly as a reaction product a stable, dry and pure alkali metal amyl xanthate free of water, mother liquor, unreacted constituents and side reaction products.

10. A xanthation process comprising bringing into contact in substantially molecular proportions carbon bisulphide and a substantially anhydrous alkali metalamylate and in such quantities that the heat of reaction between said bisulphide and amylate raises the temperature of the reacting mass to about 80° C. to produce directly as a reaction product a stable, dry and pure alkali metal amyl xanthate free of water, mother liquor, unreacted constituents and side reaction products.

WILHELM HIRSCHKIND.